United States Patent Office 3,518,238
Patented June 30, 1970

3,518,238
PROCESS FOR THE MANUFACTURE
OF POLYMERS
Akira Onishi, Shiro Anzai, Koichi Irako, Ryota Fujio, Mitsuo Enomoto, and Minoru Kojima, Tokyo, Japan, assignors to Bridgestone Tire Company Limited, Tokyo, Japan
No Drawing. Filed Oct. 17, 1968, Ser. No. 768,535
Claims priority, application Japan, Oct. 20, 1967, 42/67,198
Int. Cl. C08d 1/20; C08f 1/68
U.S. Cl. 260—82.1
20 Claims

ABSTRACT OF THE DISCLOSURE

This invention relates to a process for manufacturing polymers of conjugated diolefins in the presence of an alfin catalyst in an inert diluent at −25° C.∼120° C., with the use of a novel molecular weight moderator comprising a diolefin having double bonds in the 1 and 4 positions, to obtain the corresponding gel free polymer of a molecular weight ranging from about 50,000 to 1,250,000 which is useful as an elastomer for various uses.

---

This invention relates to a process for the manufacture of polymers of conjugated diolefins in the presence of an alfin catalyst and, more particularly to such a process in which a novel molecular weight moderator comprising one or more of a definite scope of unsaturated hydrocarbons is introduced into the reactants so as to effectively and economically produce corresponding elastomers having controlled molecular weights for various uses. The term, "polymer," "polymerization" or the like is to be used herein for representing not only the polymer or polymerization of a conjugated diolefin but also copolymer, copolymerization or the like of a conjugated diolefin with another conjugated diolefin or other conjugated diolefins, with a propylene, with an internal monoolefin or monoolefins, and with a vinyl substituted aromatic hydrocarbon or hydrocarbons.

The alfin catalysts were found by A. A. Morton et al. to be effective for polymerization of conjugated diolefins such as 1,3-butadiene, isoprene etc. details of which are disclosed in J. Am. Chem. Soc. 69 950 (1947). The polymers manufactured with the use of said catalyst have far higher molecular weights than those of the polymers obtained with the use of conventional organic sodium catalysts and the microstructure thereof is rich in trans-1,4 bond for instance in case of 1,3-butadiene. After Morton et al., copolymerization of a conjugated diolefin with other various monomers were tried in the presence of this alfin catalyst and the actual copolymerization was reported between conjugated diolefins and a conjugated diolefin with a vinyl substituted aromatic hydrocarbon (R. A. Stewart et al., Ind. Eng. Chem. 45 173 (1953)) and that of 1,3-butadiene with an olefin such as propylene-2 and pentene-2 (Japanese patent publication Nos. 3,241/60, 15,038/62, 4,79979/63).

The molecular weights of the elastomers manufactured in the presence of the alfin catalysts, however, are considerably high, i.e., up to 3,000,000 or more and it is difficult to mold such high molecular elastomers according to the usual methods into shaped articles. The alfin catalysts are also unsatisfactory in the step of polymerization due to the fact that they cause considerably higher viscosity of the reactants being polymerized and accordingly difficulties in stirring the reactant system, removal of the reaction heat and the like. Furthermore, during the way to completion of the polymerization, there often occurs sudden gelation. In the presence of such catalysts, it is thus very difficult to control the reaction and consequently to manufacture the desired elastomers in an industrial scale.

In order to overcome these faults, various suggestions have been made for controlling the polymerization rate and molecular weight of the produced polymer, which aim at attaining the purpose by changing the constituents of the catalyst or the ratio thereof for instance the mole ratio of sodium isopropoxide to allylsodium or the solvent and the like, but all of them have been found unsatisfactory for realizing the desired results. On the other hand it has been proposed to introduce into the reactants various additives as molecular weight moderators. One of them is to add an amine or ether as disclosed in U.S. Pat. 2,841,574 to W. E. Foster et al. but it has also been found unsatisfactory in that the polymerization activity is not sufficient and the resulting polymers have an increased vinyl content in the microstructure thereof in comparison with the case where no additives are introduced.

Recently a method for controlling the polymerization by adding a dihydroaromatic compound such as dihydronaphthalene, dihydrobenzene etc. has been proposed in U.S. Pat. 3,067,187, in which 1.5 to 6 parts of a molecular weight moderator is used per 100 parts of monomer, that is about 7 to 27 millimoles in case of dihydronaphthalene per mole of monomer. The patentees report that said dihydroaromatic compound is consumed by being combined with the polymer chains as the polymerization proceeds (V. L. Hansley et al., Rubber Age 94 87 (1963)). Dihydroaromatic compounds are generally synthesized by reduction of the corresponding aromatic compounds with metallic sodium. In case of dihydrobenzene, the synthesis must be done at a very low temperature such as that of liquid ammonia and thus it is apt to be isomerized to 1,2-dihydrobenzene. As for dihydronaphthalene, the synthesis is not so easy due to the higher boiling point thereof, and the necessity of using mercury acetate for isolating it as crystalline product. Thus, less expensive and more stable moderators have been earnestly sought.

We have now found novel molecular weight moderators which are cheaper and more stable than any known moderators and we have developed a new process for effectively and economically manufacturing elastomers desirable for various uses by polymerizing a conjugated diolefin with a propylene or internal monoolefin or by copolymerizing a conjugated diolefin with a vinyl substituted hydrocarbon with the use of said moderator.

Said moderators comprise at least one compound selected from unsaturated hydrocarbons represented by the formula:

$$R^1R^2C=CR^3-CHR^4-CR^5=CR^6R^7$$

wherein $R^1$ and $R^6$ are hydrogen, aromatic or aliphatic hydrocarbon radicals having up to 20 carbon atoms, and $R^2$, $R^3$, $R^4$, $R^5$ and $R^7$ are hydrogen or aliphatic hydrocarbon radicals having up to 20 carbon atoms. As the aliphatic hydrocarbon radical and as the aromatic hydrocarbon radical, methyl or ethyl and phenyl are respectively preferable.

Among the moderators are 1,4 - pentadiene, 1,4 - hexadiene, 2 - methyl - 1,4 - pentadiene, 3-methyl-1,4-pentadiene, 2,3 - dimethyl - 1,4 - pentadiene, 2,4 - dimethyl-1,4 - pentadiene, 2 - methyl - 1,4 - hexadiene 3-methyl-1, 4 - hexadiene, 4 - methyl-1,4-hexadiene, 5-methyl-1,4-hexadiene, 2,3 - dimethyl - 1,4 - hexadiene, 2,4-dimethyl-1,4 - hexadiene, 2,5 - dimethyl - 1,4 - hexadiene, 3,4-dimethyl - 1,4 - hexadiene, 3,5 - dimethyl - 1,4-hexadiene, 4,5 - dimethyl - 1,4 - hexadiene 2,3,4 - trimethyl - 1,4-hexadiene, 2,3,4 - trimethyl-1,4-hexadiene, 2,5-heptadiene, 2 - methyl - 2,5 - heptadiene, 3 - methyl - 1,4-heptadiene, 3 - methyl - 2,5 - heptadiene, 4 - methyl - 2,5-heptadiene, 2,3 - dimethyl - 2,5 - heptadiene, 2,4 - dimethyl - 2,5- heptadiene, 2,6 - dimethyl - 2,5 - heptadiene, 1,4-heptadiene, 1,4 - octadiene, n-decatriene - 1,4,9,3 - methyl-heptatriene - 1,4,6, 1-phenyl-decatriene-1,4,9,1-phenyl - decatriene - 1,4,8,3 - ethyl - 1,4 - pentadiene, 3-n-propyl-1, 4-pentadiene and analogues thereof.

Above all preferable compounds are those having the formula:

$$R^8CH=CR^9-CHR^{10}-CR^{11}=CHR^{12}$$

wherein $R^8$, $R^9$, $R^{10}$, $R^{11}$ and $R^{12}$ are hydrogen or saturated aliphatic hydrocarbon radicals having up to 4 carbon atoms. Especially 1,4-pentadiene, 1,4-hexadiene and 3-methyl-1,4-pentadiene are most preferable.

It is to be noted that there is no need to use pure, isolated compounds as the moderator according to this invention. They are sufficiently effective even if they are in the form of a mixture together with various saturated or unsaturated hydrocarbons resulting as byproducts in the production of the desired moderator compound.

Advantages or effects attained by adding the novel moderator to the reactants shall be explained hereinafter. If no moderator is used in the polymerization of 1,3-butadiene with the use of an alfin catalyst, the resulting polymer often has about a molecular weight of 5,000,000 or more and contains much gel, while in the presence of the moderator according to the present invention the molecular weight may be easily controlled at will within the range of 50,000 to 1,250,000 and no gelation occurs so that elastomers for various uses can be commercially manufactured. Furthermore, the viscosity of the polymerization products is considerably decreased according to the present invention so that the heat from stirring and the heat of reaction may be easily removed. It is noted that the polymerization activity is considerably increased as a result of the moderator whereby the yield of the desired polymer after the lapse of a given time is higher than that produced without using any moderator and the polymerization proceeds smoothly and quantitatively. This is believed to be caused by the fact that the molecular weight of the polymer being in the reactants is kept in a suitable range so as to make the reactant system homogeneous and contact of the catalyst with the monomers easy. The microstructure of the desired polymer is hardly varied nor is the vinyl content thereof increased regardless the amount of moderator used. Also the ratio of the monomer components in the polymer, in case of the copolymerization, is not varied.

The amount of the unsaturated hydrocarbon used for attaining the effects referred to above may be varied within a wide range depending on the purpose. Generally 0.001 to 0.5 mol of the hydrocarbon is used for per mol of monomer or the mixture of monomers, but more especially 0.005 to 0.1 mol gives the desired result. Furthermore, in case of polymerization of 1,3-butadiene with the use of 1,4-pentadiene, said range corresponds to about 0.6 to 12 parts per 100 parts of the monomers. Thus, the moderator of the present invention is less expensive than heretofore used moderators.

In order to attain the purpose of controlling the molecular weight, the unsaturated hydrocarbon of the present invention is used in about the same amount as or less than that of dihydronaphthalene which has been considered to be the most desirable moderator among the dihydroaromatic compounds.

The process according to the present invention using unsaturated hydrocarbons has the following advantages in comparison with the known similar processes. In the first place, most of the unsaturated hydrocarbons can be synthesized at a lower cost on an industrial scale. They are mostly obtained by the reaction of an olefin such as ethylene, propylene etc., with a diolefin such as 1,3-butadiene, isoprene etc., said raw materials are readily available at low prices. The unsaturated hydrocarbons can be prepared easily and readily according to known methods, for instances 1,4-hexadiene by the reaction of ethylene and 1,3-butadiene in the presence of a transition metal catalyst. Furthermore, it is not necessary to use these compounds in a purified and isolated form since their use in the form of the resulting reaction mixture product can attain a sufficient effect.

Secondly the compounds can be recovered from the polymerization system to be recycled. Unreacted monomers and the solvent are generally separated from the polymer and recovered, after the completion of the polymerization. It has been found that the unsaturated hydrocarbons used in the present invention can also be recovered with a similarly high efficiency from the polymerization reactants. This means that the amount of unsaturated hydrocarbons consumed in the polymerization according to the present invention is quite little and consequently the moderator is very advantageous from the commercial viewpoint. The moderator in the polymer system may be recovered together with the solvent or separately therefrom. In the former case, the moderator in the solvent can be reused in situ or with the addition of a suitable amount of the unsaturated hydrocarbon depending upon the results of a determination of the moderator content in the recovered liquid.

Thirdly the unsaturated hydrocarbons used in the present invention are quite stable. That is to say they are not polymerized with the polymerization catalyst. It has been reported that some of the conventional moderators such as dihydrobenzene, dihydronaphthalene are apt to be isomerized or polymerized under certain conditions in the presence of an organic sodium compound which is one of the constituents of the catalyst used in this invention (N. D. Scott et al., Ind. Eng. Chem. 32 312 (1940)).

It has also been reported that when dihydronaphthalene, the most desirable among the conventional moderators, is used, the efficiency of controlling the molecular weight is lowered if the moderator is contacted with the catalyst before contacting the monomers with the catalyst (V. L. Hansley et al., Rubber Age 94 87 (1963)). In contrast, the unsaturated hydrocarbons used in this invention have a sufficient effect as intended even if they are contacted with the catalyst system before the polymerization.

It should be noted above all that the unsaturated hydrocarbons are novel and particularly as moderators. Similar compounds having analogous structure such as 1,3-pentadiene, 1,3-hexadiene, 1,5-hexadiene, 2-methyl-1, 5-hexadiene, 1,7-octadiene and other similar aliphatic unsaturated hydrocarbons have been tried as moderators but no effect for controlling the molecular weight has been observed.

The alfin catalysts to be used in this invention may be prepared in accordance with any of the methods suggested by A. A. Morton et al. The constituents are a sodium alkoxide, a sodium alkenyl and a sodium halide, and the typical combination is that of sodium isopropoxide, allyl sodium and sodium halide. It has been considered that these three constituents form a close and compact crystal lattice so that the monomers are absorbed at the active points of the crystal and then the polymerization proceeds. According to one example of the process for synthesizing said catalyst, metallic sodium is dispersed in the form of finely pulverized powder in xylene and in the presence of oleic acid, in an atmosphere of an inert gas and at a predetermined temperature by agitating at a high speed above 10,000 r.p.m. and then dispersed in pentane or hexane, and after that reacted with a half mol equivalent of n-amyl chloride to form n-amylsodium and sodium chloride, to which isopropyl alcohol is added in the amount of a half mol equivalent to the resulting n-amylsodium and then pure gaseous propylene is added to said reactant system to produce sodium isopropoxide and allyl sodium. The dispersion of the catalyst is thus prepared. It is possible to obtain a similarly effective catalyst even if a higher α-olefin such as butene-1 is used instead of propylene as used in the above and a methyl-n-alkylcarbinol such as butanol-2 in lieu of isopropyl alcohol as referred to. The process for manufacturing such an active catalyst in which n-butyl chloride is used in lieu of n-amyl chloride in the economical viewpoint (see Japanese patent publication No. 3,371/67). In the present invention the moderator is effective regardless of which alfin catalyst is used.

The amount of the alfin catalyst used for the polymerization is not particularly fixed and any of the values as disclosed by A. A. Morton et al. in said printed publication will do, but in general about 0.1 to 5 weight percent based on the monomers on the basis of total sodium content is used.

As for the monomers to be polymerized or copolymerized according to this invention, 1,3-butadiene, isoprene, 1,3-pentadiene, 2-arylbutadiene, 2-methoxybutadiene and the like can be listed by way of example as conjugated diolefin. Above all 1,3-butadiene and isoprene are preferable for elastomers for various end uses. There is no limitation in as regards the monomer ratio in case of the copolymerization between conjugated diolefins. The copolymerization of 1,3-butadiene with 1,3-pentadiene and of 1,3-butadiene with isoprene are especially preferable. For instance in the case of the copolymerization of 1,3-butadiene wtih isoprene, the ratio therebetween can be freely varied but the result is more desirable in polymerization rate and physical properties of the resulting elastomers when 1,3-butadiene is not present to a lesser extent than isoprene. Namely the weight ratio of 1,3-butadiene to isoprene is preferably 99/1 to 50/50 and above all 95/5 to 85/15 is most preferable.

As for the olefins to be copolymerized with the conjugated diolefin, only propylene or internal monoolefins are used. Above all propylene, butene-2, and pentene-2 are preferable. Preferable combinations for the copolymerization are: 1,3-butadiene with propylene, 1,3-butadiene with butene-2, 1,3-butadiene with pentene-2, 1,3-butadiene with octene-2, 1,3-butadiene with 2-methylpentene, isoprene with pentene-2, 1,3-pentadiene with propylene, 1,3-pentadiene with butene-2 and 1,3-pentadiene with pentene-2. Above all copolymers of 1,3-butadiene with propylene and 1,3-butadiene with butene-2 are most preferable. There is also no limitation in the weight ratio thereof in this case but it is preferable that the weight ratio of conjugated diolefin to olefin be in the range, 99/1 to 50/50, namely that the conjugated diolefin is not present in an amount less than that of the olefin.

Among the vinyl substituted aromatic hydrocarbons to be copolymerized with the conjugated diolefin, there are styrene, alpha-methyl-styrene, vinyltoluene, paraisopropylstyrene, divinylbenzene, parachlorostyrene, and paramethoxystyrene. Above all styrene and alpha-methylstyrene are most preferable. As for the combination for the copolymerization, 1,3-butadiene with styrene and 1,3-butadiene with methylstyrene are preferable. There is also no limitation in the weight ratio but it is preferable that the weight ratio of the conjugated diolefin to the vinyl substituted aromatic hydrocarbon be in the range of 99/1 to 50/50.

As for the solvent, an aliphatic hydrocarbon having up to 20 carbon atoms such as pentane, hexane, heptane, and octane, or an aromatic hydrocarbon having up to 20 carbon atoms such as benzene, toluene and xylene, and cycloaliphatic hydrocarbon having up to 20 carbon atoms such cyclohexane and decalin are used but above all pentane, hexane, benzene, toluene and cyclohexane are preferable.

The polymerization according to the present invention is carried out in an atmosphere of an inert gas such as nitrogen or argon.

How the moderator is to be added to the polymerization reactants according to the present invention shall be illustrated hereinafter. A given amount of solvent and moderator are placed in the reactor which is then cooled to a temperature of approximately −10° C. Then the monomer or mixture of monomers are charged and a given amount of alfin catalyst is added thereto in an atmosphere of an inert gas with stirring or shaking. The moderator can be added in any other way, for instance by first contacting the moderator with the catalyst and then adding the monomer or by contacting the catalyst with and immediately after that adding the moderator thereto. Thus, the moderator can be added according to this invention in any of the batch, semi-continuous and completely continuous polymerization methods.

The polymerization temperature is not particularly limited in connection with the novel moderator but it is carried out generally at a temperature ranging from −25° C. to 120° C. and more preferably from 0° C. to 80° C.

After polymerization for a given time, the polymer or copolymer is recovered according to any of the usual methods. For instance the polymerization is stopped by adding methanol, water or the like to the reactant system and then the polymer is taken out and washed with a large quantity of methanol and water. If necessary a small quantity of hydrochloric or acetic acid is added to dissolve the catalyst residue on washing. The recovered polymer is dried in vacuo and the intrinsic viscosity thereof is determined in toluene to calculate the viscosity and average molecular weight. Further, 0.25 g. of the resulting polymer is immersed in 100 ml. of toluene and shaken for two hours at 70° C. The undissolved part is separated and dried in vacuo to calculate the gel content.

In the case of the polymerization of 1,3-butadiene according to the present invention it has been found that the intrinsic viscosity of the resulting polymer can be controlled at will within the range of 2.0 to 9.0 as useful for the synthetic rubber for various uses depending on the amount of moderator used and there is contained substantially no gel in contrast with the case of using no moderator in which the intrinsic viscosity is about 10 to 16 or more and a considerable amount of gel is contained.

It has been also found that the microstructure of the polymer is not substantially varied regardless of the amount of moderator used, according to infrared analysis. In the case of the polymerization of 1,3-butadiene, the analysis shows about 70% of trans-1,4 bond, about 20 to 30% vinyl content and about 0 to 10% cis-1,4 bond. The resulting polymer can be easily vulcanized like the usual industrial rubber, and the vulcanized product is superior in wear resistance, fatigue under bending, tensile strength, shearing strength and like which are necessary for industrial elastomers.

Further, since it is possible to control the polymerization and at a same time to produce a polymer containing substantially no gel with the use of the moderator according to the present invention, various additives such as a processing oil, a lower-priced aliphatic or aromatic, carbon black, or other plasticizer, filler may be added to the molecular weight controlled polymer so as to produce economical elastomers.

EXAMPLE 1

92 g. (4 mol) of sodium metal was added to 184 g. of purified xylene and 0.92 g. of oleic acid in a four necked flask and was stirred at 10,000 r.p.m. for 30 min. at 105° C. under a nitrogen stream in order to prepare a finely divided sodium metal suspension.

1.04 mol of said suspension was transferred to another flask and diluted with an excess of hexane, cooled to −20° C. and there was added thereto 0.52 mol of n-amylchloride by drops over 2 hours. After that, the resulting solution was aged for a few hours at room temperature and then 0.2 mol of isopropanol was added dropwise at 0° C. over 1 hour and stirring was further continued for 1 hour. Into the reaction system which was maintained at 10° C., a purified propylene gas was passed, and then reacted for 2 hrs. at 20° C. After that, the excess propylene was removed from said system at room temperature to yield a yellowish-green brown hexane solution of the alfin catalyst. The concentration of active sodium (allyl sodium and sodium iso-propoxide) contained in said catalyst was 0.68 mol/l. (hereinafter the concentration of the catalyst shown as similarly calculated on a mol basis of the active sodium).

35 g. of hexane, 3.0 mmol of 1,4-pentadiene and 150 mmol (8.71 g.) of 1,3-butadiene were added to a sufficiently dried pressure bottle having 150 ml. capacity after being purged by nitrogen gas, and then 3.0 mmol of the alfin catalyst prepared as shown above was added. The bottle was closed and polymerization was carried out at 25° C. while shaking.

After two hours, a methanol solution of phenyl-$\beta$-naphthyl amine was added as an antioxidant to the reaction system. The polymer obtained was dried in vacuum after sufficiently washing same with a large amount of methanol and water.

The yield of gummy polymer obtained was 86.3 percent on the weight basis of the monomer. The polymer had an intrinsic viscosity of 3.5 and viscosity-average molecular weight of about 446,000. No gel was detected in the polymer.

An infrared analysis showed that 68.5% of trans 1,4-bond, 28.5% of vinyl bond and 3.0% of cis 1,4-bond were contained in the polymer.

Referential Example 1

The polymerization of 1,3-butadiene was similarly carried out using the catalyst prepared according to the process of Example 1 but without using 1,4-pentadiene. After two hours the reactant system became viscous and the resulting polymer was treated according to the procedure of Example 1.

A polymer containing 41.5% of gel was obtained at a yield of 41.3% on the weight basis of the monomer.

The part of said polymer soluble in toluene had an intrinsic viscosity of 13.9 and an average molecular weight of about 4,130,000 determined by the viscosity.

The polymer was not gummy but rather resembled a resinous material and was difficult to process or treat.

EXAMPLE 2

1,3-butadiene was polymerized according to the procedure of Example 1 except that 1,4-hexadiene was used instead of 1,4-pentadiene as moderator.

The following results were obtained.

TABLE 1

| | 1,4-hexadiene 1,3-butadiene (mol/ratio) | Yield, percent | $[\eta]$[1] | Gel content, percent |
|---|---|---|---|---|
| Run No.: | | | | |
| 1 | 1.0/100 | 90.5 | 6.77 | 0 |
| 2 | 2.0/100 | 93.2 | 4.60 | 0 |
| 3 | 4.0/100 | 96.4 | 2.94 | 0 |

[1] $[\eta]$ represents intrinsic viscosity.

EXAMPLE 3

The catalyst was prepared according to the procedure of Example 1 and had a concentration of 0.72 mol/l.

1,3-butadiene was similarly polymerized using 1.5 mmol of said catalyst except that 3-methyl-1,4-pentadiene was used as moderator.

The results of these runs appear in Table 2.

TABLE 2

| | 3-methyl-1,4-pentadiene/1,3-butadiene (mol/ratio) | Yield, percent | $[\eta]$ | Gel content, percent | Result of Infrared Analysis, percent | | |
|---|---|---|---|---|---|---|---|
| | | | | | Trans | Vinyl | Cis |
| Run No.: | | | | | | | |
| 1 | 0.5/100 | 96.1 | 7.9 | 0 | | | |
| 2 | 2.0/100 | 90.5 | 4.1 | 0 | | | |
| 3 | 4.0/100 | 88.7 | 3.2 | 0 | 71.5 | 28.5 | 0 |
| Referential Example 2 | 0 | 98.0 | 15.1 | 76.5 | | | |

EXAMPLE 4

To 76.2 ml. of hexane in a pressure bottle having 150 ml. capacity, 7.11 g. (131.5 mmol) of 1,3-butadiene and 1.26 g., 18.5 mmol) of isoprene were added and the amount of moderator as shown in the following Table 3 was added to the reaction mixture.

To the reaction mixture, 2.1 mmol of the catalyst used in Example 3 was added and the pressure bottle was closed. Copolymerization was carried out at 20° C. for 2 hours. The after-treatment according to Example 1 was done to obtain the following results.

TABLE 3

| | Moderator | Moderator/monomer (mol/ratio) | Yield, percent | $[\eta]$ | Gel content, percent |
|---|---|---|---|---|---|
| Run No.: | | | | | |
| 1 | 2-methyl-1,4-pentadiene | 3/100 | 84.1 | 4.49 | 0 |
| 2 | 1,4-heptadiene | 4/100 | 90.0 | 4.07 | 0 |
| 3 | 1,4-octadiene | 3/100 | 82.5 | 6.0 | 0 |
| 4 | 5-methyl-1,4-hexadiene | 6/100 | 84.4 | 6.6 | 0 |
| 5 | 2,4-dimethyl-1,4-pentadiene | 6/100 | 80.5 | 8.0 | 0 |
| 6 | 3-methyl-1,4-heptadiene | 2/100 | 80.2 | 5.55 | 0 |
| 7 | 1-phenyl-1,4,9-decatriene | 2/100 | 27.0 | 8.59 | 0 |
| Referential Example 3 | | | 61.7 | 19.8 | 74.7 |

Referential Example 4

Copolymerizations of 1,3-butadiene and isoprene were carried out in the same manner as in Example 3 with the use of 1,3-pentadiene, 1,3-hexadiene, 2-methyl-1,5-hexadiene and 1,7-octadiene instead of the moderators mentioned in Example 4. The results of these runs appear in Table 4.

TABLE 4

| | Moderator | Moderator/monomer (mol/ratio) | Yield, percent | $[\eta]$ | Gel content, percent |
|---|---|---|---|---|---|
| Run No.: | | | | | |
| 1 | 1,3-pentadiene | 4.0/100 | 52.2 | 12.1 | 11.0 |
| 2 | 1,3-hexadiene | 2.0/100 | 62.0 | 13.5 | 12.0 |
| 3 | 2-methyl-1,5-hexadiene | 2.0/100 | 42.2 | 12.1 | 5.5 |
| 4 | 1,7-octadiene | 2.0/100 | 71.7 | 10.1 | 5.0 |

From the results shown above, it is seen that only such unsaturated hydrocarbons as specified herein can effectively control the molecular weight and that other similar compounds not having the unsaturated hydrocarbon of this invention do not have such an effect.

EXAMPLE 5

Copolymerization of 1,3-butadiene and isoprene was carried out in a manner similar to Example 4, the results of which are shown in Table 5.

TABLE 5

| | Moderator | Moderator/monomer (mol/ratio) | Yield, percent | $[\eta]$ | Gel content, percent |
|---|---|---|---|---|---|
| Run No.: | | | | | |
| 1 | 2,3-dimethyl-1,4-pentadiene | 3/100 | 82.5 | 7.60 | 0 |
| 2 | 3-methyl-1,4,6-heptatriene | 4/100 | 86.2 | 4.00 | 0 |

EXAMPLE 6

Copolymerization of 1,3-butadiene and isoprene was performed using 1,4-hexadiene as moderator and varying the method of addition of the moderator.

As a first procedure, 76.2 ml. of hexane, 4.5 mmol of 1,4-hexadiene, 7.11 g. of 1,3-butadiene and 1.2 g. of isoprene were taken as in Example 4 in the pressure bottle of 150 ml. The reaction was sufficiently stirred and 2.1 mmol of the catalyst was added thereto. After said bottle was closed, the polymerization was effected at 20° C. while stirring and stopped after 2 hours.

As a second procedure, the same respective amounts of hexane, 1,4-hexadiene and the catalyst were introduced in this order in a similar pressure bottle which was then closed, and left standing for an hour at room temperature. After that, the bottle was cooled to −10° C. and a mixture of 1,3-butadiene and isoprene were added thereto. The polymerization was similarly carried out at 20° C. The results of these runs appear in Table 6.

TABLE 6

| Polymerization method | Yield, percent | $[\eta]$ | Gel content, percent |
|---|---|---|---|
| Run No.: | | | |
| 1 ____ Moderator plus monomer plus catalyst. | 82.5 | 3.14 | 0 |
| 2 ____ Moderator plus catalyst plus monomer. | 89.7 | 3.20 | 0 |

In the table, the brackets around moderator and catalyst in Run 2 mean aging for an hour at room temperature. From said results, it will be seen that there is no difference in the effect of the moderator even if it is previously contacted with the catalyst before starting the polymerization.

EXAMPLE 7

1,3-butadiene and 1,3-pentadiene (the weight ratio was 85/15 and the sum of each monomer was 150 mmol) were copolymerized in the presence of 3 mmol of the catalyst used in Example 1 and 3 mmol of 1,4-pentadiene as moderator.

The polymerization was carried out for 2 hours at 20° C., the result of which is shown in comparison with that of a control wherein no moderator was used.

TABLE 7

| | Moderator | Yield, percent | $[\eta]$ | Gel content, percent |
|---|---|---|---|---|
| Run No. 1 | 1,4-pentadiene | 79.0 | 3.2 | 0 |
| Referential Example 5 | None | 79.0 | 9.8 | 4.5 |

EXAMPLE 8

In a stainless steel autoclave having 25 l. capacity, the content of which was substituted with nitrogen gas, 10.20 kg. of toluene and 0.5834 mol of 1,4-hexadiene were taken and cooled to −5° C. 1.445 kg. of 1,3-butadiene and 0.255 kg. of styrene (ratio of 1.3-butadiene/styrene=85/15 by weight) were added to said mixture and after stirring, 0.219 mol of the catalyst as used in Example 3 was added.

The polymerization was carried out for four hours at 25° C. while stirring and was stopped by adding a methanol solution of phenyl-β-naphthylamine. The polymer solution was diluted with two volumes of toluene and then washed with a large amount of water. The polymer was recovered by steam stripping.

The polymer obtained had an intrinsic viscosity of 3.7 and a Mooney viscosity of 104.0. No gel was contained in the obtained polymer. Infrared analysis showed that a polymer having 67.7% of trans-1,4 bond, 28.7% of vinyl bond, 3.6% of cis-1,4 bond and 15% of styrene bond was obtained.

By adding 37.5 parts of an aromatic process oil (JSR Aroma) to 100 parts of the polymer obtained and kneading on rolls, an oil extended rubber having a Mooney viscosity of 56.6 and able to be easily processed was obtained.

EXAMPLE 9

1,3 butadiene was polymerized according to the process of Example 1 but the polymerization was carried out at 20° C. for 24 hours in a pressure bottle having 300 ml. of capacity using 300 mmol of 1,3-butadiene, 150 ml. of hexane, 9 mmol of 1,4-hexadiene and 4.5 mmol of the catalyst of Example 1.

The obtained polymer solution was directly transferred to a closed glass vessel and immediately steam was blown in. All steam and hexane vapor ditilled were led into a condenser to be completely collected. The yield of the polymer collected from said glass vessel was 100%. The intrinsic viscosity thereof was 3.35 and no gel was contained therein. On the other hand, water and hexane collected with the condenser were separated to analyze the hexane layer by gas-chromatography. Peaks of n-hexane and 1,4-hexadiene only were detected but no 1,3-butadiene was detected. By determining the degree of unsaturation of the hexane layer using ICl, the total amount of 1,4-hexadiene in the recovered solvent was calculated to be 95.8% based on the amount initially used.

EXAMPLE 10

1,3-butadiene was similarly polymerized with the use of n-hexane containing 1,4-hexadiene recovered in Example 9 as solvent.

A polymer having an intrinsic viscosity of 4.03 and containing no gel was obtained in substantially 100% yield.

From the results as shown above, it is noted that the recovered 1,4-hexadiene is sufficiently effective as a moderator and can be repeatedly reused.

EXAMPLE 11

To 550 ml. of a refined hexane charged in a four necked flask which had been dried and of which the content was purged with nitrogen gas, a sodium dispersion containing 0.776 mol of sodium metal was added and stirred. 0.258 mol of isopropanol was added dropwise over about 30 min. at room temperature and stirring was further continued for 30 min. 0.258 mol of n-butyl chloride was added dropwise over 30 min. while stirring and cooled to −10° C., to which dry propylene was blown over about an hour. The system was then heated gradually up to room temperature and the excess propylene remaining was removed therfrom while stirring. The concentration of active sodium metal contained in the resulting catalyst was 0.827 mol/l.

To a 300 ml. pressure bottle, 150 ml. of hexane, 0.3 mol of 1,3-butadiene, 18 mmol of 1,4-hexadiene and 3.0 mmol of said catalyst were charged to proceed with the polymerization at 20° C. for one hour. A polymer having an intrinsic viscosity of 3.1 and a molecular weight of about 355,000 and containing no gel was obtained in a yield of 62.2%.

Referential Example 6

The polymerization was carried out in a manner similar to Example 10 except that the moderator was omitted.

A polymer having 73% of gel and an intrinsic viscosity of 16.3 in the toluene soluble part thereof was obtained in a yield of 60.5%.

EXAMPLE 12

The catalyst was prepared according to the procedure of Example 1 except that more isopropanol was added than in Example 1. Namely, to 1.00 mol of metallic sodium dispersion and 1,300 ml. of hexane, 0.50 mol of n-amylchloride was added dropwise at −20° C. Thus, 0.421 mol of n-amylsodium was obtained at yield of 84.2%. 0.236 mol of isopropanol was added dropwise to the catalyst solution at 0° C., for 1 hour. While cooling the system, a purified propylene gas was passed therethrough for about 2 hours, the temperature thereof was raised to room temperature and then further stirring was continued for 2 hours. The amount of active sodium in the resulting catalyst was 0.64 mol/l., but the mol-ratio of allyl sodium to sodium isopropoxide was 0.44/0.56 in contrast with a substantially 1/1 mol ratio in the catalyst of Example 1.

1,3-butadiene and propylene were copolymerized using said catalyst, by charging 9.75 g. of 1,3-butadiene, 9.71 g. of propylene, 90 ml. of hexane, and 5.4 mmol of 1,4-hexadiene in a glass reactor resistant to a pressure of 20 kg./cm². 3.6 mmol of the catalyst was added under pressure to said reactants to proceed with the polymerization at 20° C., for 20 hrs. The reaction system was treated according to Example 1, to obtain 8.24 g. of a gummy elastomer having an intrinsic viscosity of 3.5 and containing no gel. The degree of unsaturation was determined according to the method described by T. S. Lee et al. in J. Polymer Sci. 3, 66 (1948). It was found that 6.4% of the propylene was bonded to 1,3-butadiene by calculating the number of propylene units contained in the polymer from the difference between the degree of unsaturation of polybutadiene and that of the resulting polymer. It can be deduced that polylene was not polymerized by itself with use of said catalyst system. From the result that no molecule having propylene units was detected in the oxidation-decomposition product according to the oxidation treatment of I. M. Kolthoff et al. [J. Polymer Sci. 1, 429 (1946)] in whic hthe polymer was submitted to oxidative degradation with tertiary butyl hydroperoxide-osmium tetraoxide in p-dichlorobenzene, 1,3-butadiene and propylene are considered to be bonded at random.

EXAMPLE 13

Copolymerizations of 1,3-butadiene with internal monoolefins such as butene-2, pentene-2, octene-2 and 2-methyl pentene according to the procedure of Example 12 and with the use of the catalyst as prepared in Example 1. The amount of the olefins contained in the polymer was calculated by determining the degree of unsaturation and the results of these runs appear in Table 8.

TABLE 8

| Run No. | Butadiene (Mol) | Olefins | Mol | Yield,[1] percent | $[\eta]$ | Gel content, percent | Olefin content,[2] percent | Recovery of the oxidation product, percent[3] |
|---|---|---|---|---|---|---|---|---|
| 1 | 0.1 | Butene-2 | 0.2 | 106.0 | 2.59 | 0 | 19.3 | 0 |
| 2 | 0.2 | Pentene-2 | 0.1 | 100.0 | 2.78 | 0 | 4.1 | 0 |
| 3 | 0.15 | Octene-2 | 0.15 | 97.3 | 4.38 | 0 | 22.1 | 0 |
| 4 | 0.20 | 2-methyl pentene | 0.1 | 98.3 | 2.91 | 0 | 15.6 | 0 |

[1] Determined on the weight basis of butadiene monomer used.
[2] Calculated from the degree of unsaturation.
[3] Determined according to the method of I. M. Kolthoff et al.

Common reaction conditions:

Catalyst/monomer (butadiene+olefin)=20/1000 (mol ratio)
Solvent: hexane, hexane/monomer (butadiene+olefin) =6/1 (weight ratio)
Polymerization temperature: 60° C.
Polymerization time: 20 hrs.

EXAMPLE 14

A catalyst was prepared according to the procedure of Example 1. The concentration of active sodium in the catalyst was 0.763 mol/l.

In a 100 l. stainless steel autoclave having a stirrer of the elbow type which was sufficiently dried and which was purged with nitrogen, 45.04 kg. of toluene was charged. Cooling down to −5° C., 4.11 mol of 1,4-hexadiene, 7.467 kg. (138.05 mol) of 1,3-butadiene and 0.393 kg. (5.77 mol) of isoprene (1,3-butadiene/isoprene=95/5 by weight) were added thereto and stirred. 0.863 mol of said catalyst was added to said mixture while stirring to proceed with the polymerization at 25° C.

After 3 hours, a methanol solution containing a small amount of phenyl-β-naphthylamine was added to stop the polymerization reaction, when the yield of polymer was 98%. Further the polymer was diluted with toluene and washed with a large amount of water.

A small amount of the polymer solution was sampled, and after being dried in vacuum the polymer was analyzed and showed an intrinsic viscosity of 4.78 and a Mooney viscosity (ML–4) of 105.0 and no existence of gel. It was found according to infrared analysis that 69.5% of trans-1,4 bond, 26.8% of vinyl bond, 3.8% of cis 1,4-bond and 5% of isoprene were contained in the polymer.

37.5 parts of an aromatic process oil (JSR-Aroma) were added to 100 parts of the polymer contained in the washed polymer solution, stirred sufficiently, and steam was blown thereinto to remove the toluene contained as solvent. The polymer mass obtained was finely divided and dried. The obtained oil extended polymer had an intrinsic viscosity of 2.94 and a Mooney viscosity of 56.5. It was well processed.

Said oil extended polymer was compounded as shown in the following Table 9 and vulcanized at 145° C. for 30 minutes and various properties of said polymer were tested as in Table 10. As a reference control, the physical properties of SBR 1712 (not containing oil) obtained by an emulsion polymerization is also shown in Table 10.

Table 9

| | Parts |
|---|---|
| Polymer | 100 |
| JSR Aroma | 37.5 |
| ISAF | 68 |
| Stearic acid | 2 |
| ZnO | 3 |
| Sulfur | 1.5 |
| Accelerator (total) | 1.45 |

TABLE 10

| | Polymer of this example | SBR 1712 |
|---|---|---|
| Hardness 22' | 50 | 51 |
| Elongation (percent) | 640 | 640 |
| Tensile strength (kg./cm.²) | 200 | 195 |
| 300%, modulus (kg./cm.²) | 53 | 67 |
| Resilience (percent) | 48 | 46 |
| Abrasion loss (percent) | 83 | 100 |

The abrasion test on the road of a tire molded from the oil extended elastomer obtained in this example was carried out and showed that said polymer had a superior abrasion property by 14% to that of the "Emulsion SBR" in the abrasion index.

What is claimed is:

1. A process for the manufacture of a polymer of a conjugated diolefin comprising polymerizing said diolefin in an inert diluent, at a temperature of −25° C. to 120° C. in the presence of an alfin catalyst, and a molecular weight moderator which is an unsaturated hydrocarbon represented by the following formula;

$$R^1R^2C=CR^3-CHR^4-CR^5=CR^6R^7$$

wherein $R^1$ and $R^6$ are selected from the group consisting of hydrogen, aliphatic hydrocarbon radicals having up to 20 carbon atoms and aromatic hydrocarbon radicals having up to 20 carbon atoms, and $R^2$, $R^3$, $R^4$, $R^5$ and $R^7$ are selected from the group consisting of hydrogen and aliphatic hydrocarbon radicals having up to 20 carbon atoms to control the molecular weight of the polymer.

2. The process as set forth in claim 1, in which the unsaturated hydrocarbon added as a molecular weight moderator remaining unconsumed in the reactant system is recovered for reuse as a moderator.

3. The process as set forth in claim 1, in which 0.005 to 0.1 mol of the unsaturated hydrocarbon per mol of conjugated diolefin to be polymerized is added.

4. The process as set forth in claim 1, in which the unsaturated hydrocarbon is a compound represented by the formula;

$$R^8HC{=}CR^9{-}CHR^{10}{-}CR^{11}{=}CHR^{12}$$

wherein $R^8$, $R^9$, $R^{10}$, $R^{11}$ and $R^{12}$ are selected from the group consisting of hydrogen and aliphatic hydrocarbon radicals having up to 4 carbon atoms.

5. The process as set forth in claim 1, in which the unsaturated hydrocarbon is a compound represented by the formula;

$$R^{13}HC{=}CR^{14}{-}CH_2{-}CR^{15}{=}CHR^{16}$$

wherein $R^{13}$, $R^{14}$, $R^{15}$ and $R^{16}$ are selected from the group consisting of hydrogen and methyl radical.

6. The process as set forth in claim 5, in which the unsaturated hydrocarbon is 1,4-pentadiene.

7. The process as set forth in claim 5, in which the unsaturated hydrocarbon is 1,4-hexadiene.

8. The process as set forth in claim 1, in which the unsaturated hydrocarbon is a compound represented by the formula;

$$R_{17}HC{=}CR^{18}{-}\overset{\underset{|}{CH_3}}{CH}{-}CR^{19}{-}CHR^{20}$$

wherein $R^{17}$, $R^{18}$, $R^{19}$ and $R^{20}$ are selected from the group consisting of hydrogen and methyl radical.

9. The process as set forth in claim 8, in which the unsaturated hydrocarbon is 3-methyl-1,4-pentadiene.

10. The process as set forth in claim 1, wherein the conjugated diolefin is selected from the group consisting of 1,3-butadiene and isoprene.

11. The process as set forth in claim 1, wherein a plurality of conjugated diolefins are copolymerized.

12. The process as set forth in claim 11, in which 1,3-butadiene and isoprene are copolymerized in a weight ratio of 50/50 to 99/1.

13. The process as set forth in claim 1, in which the conjugated diolefin is copolymerized with propylene.

14. The process as set forth in claim 13, in which the conjugated diolefin is 1,3-butadiene and the weight ratio of 1,3-butadiene to propylene ranges from 50/50 to 99/1.

15. The process as set forth in claim 1, in which the conjugated diolefin is copolymerized with an internal monoolefin.

16. The process as set forth in claim 15, in which the conjugated diolefin is 1,3-butadiene and the internal monoolefin is butene-2, said materials being copolymerized in a weight ratio of 50/50 to 99/1.

17. The process as set forth in claim 1, in which the conjugated diolefin is copolymerized with a vinyl substituted aromatic hydrocarbon in a weight ratio of 50/50 to 99/1.

18. The process as set forth in claim 17, in which the conjugated diolefin is selected from the group consisting of 1,3-butadiene and isoprene and the vinyl substituted aromatic hydrocarbon is selected from the group consisting of styrene and α-methylstyrene.

19. The process as set forth in claim 1, wherein the temperature is 0° to 80° C.

20. A process for the manufacture of a copolymer of 1,3-butadiene and isoprene in which a mixture of said comonomers wherein the 1,3-butadiene content amounts to 85 to 99 weight percent is polymerized in hexane, at a temperature of 0° to 80° C., in the presence of an alfin catalyst consisting of allylsodium, sodium isopropoxide and sodium chloride, and in the presence of 1,4-hexadiene to control the molecular weight of the polymer.

References Cited

UNITED STATES PATENTS

| 3,067,187 | 12/1962 | Greenberg et al. | 260—94.2 |
| 3,223,691 | 12/1965 | Greenberg et al. | 260—93.5 |
| 3,448,093 | 6/1969 | Grinninger et al. | 260—80.7 |
| 3,331,826 | 7/1967 | Talcott | 260—94.2 |
| 3,418,297 | 12/1968 | Grinninger et al. | 260—82.1 |
| 3,423,379 | 1/1969 | Grinninger et al. | 260—82.1 |

JOSEPH L. SCHOFER, Primary Examiner

J. C. HAIGHT, Assistant Examiner

U.S. Cl. X.R.

260—80.7, 83.7, 85.3, 94.2